Patented Nov. 18, 1930

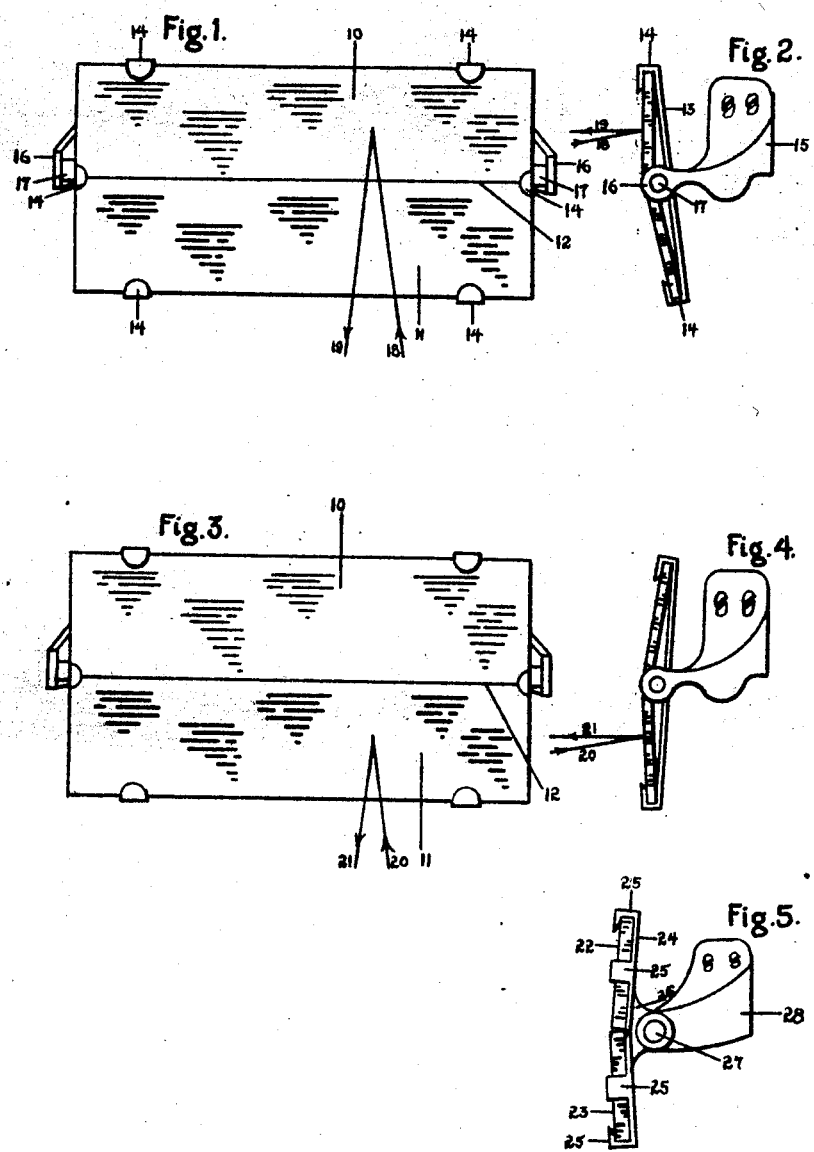

1,781,999

UNITED STATES PATENT OFFICE

CHARLES BITTINGER, OF BROOKLINE, MASSACHUSETTS

REAR-VIEW MIRROR

Application filed March 16, 1929. Serial No. 347,512.

This invention relates to an improved rear view mirror with two reflection factors, of such simple construction that it can be produced at a minimum cost, and which is so easy to manipulate that the mirrors can be changed by a touch of the hand.

For the safety of all who use motor vehicles the rear view mirror is a prime necessity and its installation is made compulsory in most States. However valuable it may be in the day time, the glare of headlights in the mirror at night makes the ordinary mirror a liability rather than an asset. By using at night a second mirror of low reflection factor the glare from the headlights is so reduced that the visual acuity of the person using the mirror is retained at its maximum. Although the problem has been accorded some consideration heretofore, it has not previously been recognized that for success, the transition from day driving to night driving position must be of such facility as to be instantaneous and merely incidental to a continuation of the driving of the vehicle by the operator.

Among the objects of the invention are; to improve the construction of rear view mirrors for vehicles; to provide a combined day and night mirror of such construction as to facilitate their alternate use; to provide mirrors for vehicles at a minimum of manufacturing expense; to provide a combined night and day rear view mirror operable alternately while the vehicle is in operation; and many other objects and advantages, as will become more apparent as the description proceeds.

In the accompanying drawings, Fig. 1, represents a front elevation of a mirror constructed in accordance with the invention and indicating by heavy lines the reflection of impinged light rays reflected from the upper, daylight portion of the mirror, Fig. 2, represents a side elevation of the same, Fig. 3, represents a front elevation of the same mirror assembly, with the lower night driving mirror in operative position and indicating by heavy lines the impinged and reflected light rays, Fig. 4, represents a side elevation of the same, and Fig. 5, represents a side elevation of a slightly modified form of mirror assembly.

The mirror assembly comprises a high reflection mirror (10), for instance such as has a silvered rear surface. A black night driving mirror (11) is arranged with its reflective surface angularly divergent from the reflective surface of the mirror (10), but in edge abutting relation to mirror (10), for which purposes the contiguous edges of mirrors (10) and (11) may be beveled as desired, to form a single line jointure as at (12). Mirrors (10) and (11) are held with their faces at an obtuse angle by means of a backing plate (13), and clips (14). A bracket (15) is provided having ears (16) in which studs (17) carried by a backing plate (13) are frictionally journaled for oscillation.

It will be observed that with the assembled mirror disposed in the position shown in Figs. 1 and 2, the images of objects in rear of the vehicle are incident upon mirror surface (10) as indicated by the black line (18) and are reflected to the eye of the observer, as indicated by line (19). For night driving, the mirror assembly is quickly and easily oscillated in the journals a very few degrees, so as to present the blackened mirror (11) to view, so that bright rays emanating in rear of the vehicle, as from a following motor vehicle, as indicated by the black line (20) will strike the blackened mirror and will in large measure be absorbed but leave a small portion to be reflected from the surface thereof to present a sharply diminished reflection (21) to the observer or operator of the automobile.

In Fig. 5, a modification of great economy is presented, wherein individual mirrors respectively (22) and (23), for the high and low reflection factors, are imposed upon the angularly divergent faces of a unitary backing plate (24), and held thereon by any suitable means such as clips (25). The backing strip may carry an integral boss (26), having pivotal connection as at (27) to a bracket (28).

The use of the device disclosed in Fig. 5 is similar to the use of the other forms, and simply discloses a very economical construction which is thoroughly operative for the purpose.

I am aware that it has been proposed heretofore, to arrange night and day driving mirrors in oppositely disposed relation such that use of the alternate mirrors requires a complete reversal of the assembly and I do not claim such constructions.

I claim as my invention:

1. A combined night and day driving mirror for motor vehicles, comprising a plurality of mirror surfaces having sharply different factors of reflection, means for supporting said mirror surfaces in obtuse angular relation, means for supporting the assembly in such manner that slight angular movement of the unit changes the disposition of the mirrors so as to vary the reflections to a given point.

2. In combination an oscillatable backing strip, a high reflection mirror, and a low reflection mirror carried by said backing strip, with their faces out of parallelism.

3. In combination, a bracket, a backing strip oscillatably mounted on said bracket, the backing strip having divergent faces, a high reflection mirror imposed upon one of said faces and a low reflection mirror imposed upon the other of said faces.

4. In combination a high reflection mirror, a low reflection mirror, means for operatively supporting the mirrors one substantially vertically above the other with their faces out of parallelism but with their reflecting surfaces presenting on one side of a vertical plane behind the mirrors, means operatively connecting the mirrors and so arranged that manual manipulation of one mirror changes the face angle of the other mirror relative to the horizontal.

In testimony whereof, I affix my signature.

CHARLES BITTINGER.